United States Patent [19]

Myers et al.

[11] 4,070,159

[45] Jan. 24, 1978

[54] APPARATUS FOR SEPARATING SOLID DISPERSOIDS FROM GASEOUS STREAMS

[75] Inventors: George D. Myers; Paul W. Walters, both of Ashland; Robert L. Cottage, Catlettsburg, all of Ky.

[73] Assignee: Ashland Oil, Inc., Ashland, Ky.

[21] Appl. No.: 800,780

[22] Filed: May 26, 1977

Related U.S. Application Data

[60] Continuation-in-part of Ser. No. 753,231, Dec. 20, 1976, abandoned, which is a division of Ser. No. 561,625, March 24, 1975, abandoned.

[51] Int. Cl.$^2$ .................. B01J 8/18; B01D 45/00
[52] U.S. Cl. .................. 23/288 E; 23/288 S; 55/1; 55/342; 55/392; 208/161; 252/417
[58] Field of Search .............. 23/288 S, 288 E, 288 B, 23/284; 55/1, 342, 461, 392; 252/417; 208/153, 161, 164

[56] References Cited

U.S. PATENT DOCUMENTS

| 1,600,762 | 9/1926 | Hawley | 55/1 |
| 2,901,420 | 8/1959 | Evans | 208/153 |
| 3,074,878 | 1/1963 | Pappas | 208/161 X |
| 3,152,066 | 10/1964 | Wickham | 55/342 X |
| 3,838,036 | 9/1974 | Stine et al. | 208/153 X |
| 3,846,280 | 11/1974 | Owen et al. | 23/288 S X |
| 4,035,284 | 7/1977 | Gross et al. | 23/288 S |

Primary Examiner—Morris O. Wolk
Assistant Examiner—Roger F. Phillips

[57] ABSTRACT

An apparatus for the removal or collection of solid dispersoids in gases which structurally comprises a combination of a gravity settling chamber and a cyclonic separator. In operation, the bulk of the entrained solids of a gas/solid fluid stream is alone discharged from a conduit transporting said stream into the settling chamber and collected therein whereas the gas phase containing only residual amounts of entrained solids is simultaneously diverted through a cyclonic separator to complete the removal of the solids from the gas stream.

4 Claims, 5 Drawing Figures

APPARATUS FOR SEPARATING SOLID DISPERSOIDS FROM GASEOUS STREAMS

CROSS-REFERENCE TO RELATED APPLICATION

This is a continuation-in-part of application Ser. No. 753,231, filed Dec. 20, 1976, now abandoned, which in turn is a divisional of application Ser. No. 561,625 filed Mar. 24, 1975, now abandoned.

BACKGROUND OF THE INVENTION

1. Field of the Invention.

This invention relates to an apparatus for effecting gas/solids separation. In narrow aspects it concerns an apparatus for implementing the fluid catalytic cracking of petroleum hydrocarbons and the separation of the catalyst particulates from the resultant cracked stream.

2. Description of the Prior Art

Numerous industrial operations present the need for removing solid particulates suspended in a gaseous medium wherein the particulates range in size from about 5 to 100µ. While a variety of methods are available for achieving such separation, the use of either gravitational or centrifugal acceleration for this purpose is preferred because of economical considerations. Separation by gravity alone, because of necessity for reducing the gas flow rate to a minimum superficial velocity, generally requires a settling chamber having a size which is too excessive for most operations. This is particularly the case in those instances where the solids present are of a size less than about 50µ. On the other hand, separation by centrifugal acceleration as experienced in cyclone separators is prone to give rise to frequent mechanical failures especially if the solids are abrasive in nature or if the cumulative amount to be separated results in abrasion conditions.

OBJECT

The primary object of this invention is to provide a structural arrangement in the form of the combination of a gravity settler and cyclone separator whereby separation of the bulk of the solids suspended in a gas stream is accomplished in the gravity settler while essentially simultaneously collecting the residual amounts of solid present in the gas stream by means of the cyclone separator.

SUMMARY OF THE INVENTION

In accordance with the present invention, an apparatus combination is provided for separating the solid dispersoids from a fluid gas-solids stream. The elements of the apparatus comprise an elongated tubular conduit for transporting the fluid stream, a gravity settling or solids disengaging chamber and a single or multi-stage cyclonic separation system. The cooperative arrangement of said elements is one whereby the discharge extremity end of the conduit is in open communication with the disengaging chamber, which is otherwise essentially closed to the flow of gases. The inlet of the cyclonic separation system, the latter optionally positioned within or without the disengaging chamber, is in open communication with the transport conduit via a sidewise port upstream of but near said discharge opening thereof.

The preferred embodiment of the invention is in the form of a fluid catalytic cracker unit (FCC) whereby the transport conduit serves as the so-called riser tube component of such units. A number of advantages are realized in this embodiment of the invention, foremost of which include improved catalyst collection efficiency and the use of higher temperatures for conducting the cracking reaction by virtue of the fact that the catalyst can be separated from the cracked hydrocarbon stream much more quickly than has hitherto been possible. In this preferred embodiment, the invention further contemplates the riser tube taking the form of a tapered design for the initial upstream portion thereof. This configuration allows for increased control of reactants residence time and additionally serves to further facilitate the disengagement of the catalyst from the fluid stream.

DESCRIPTION OF THE PREFERRED EMBODIMENT

Figure 1:
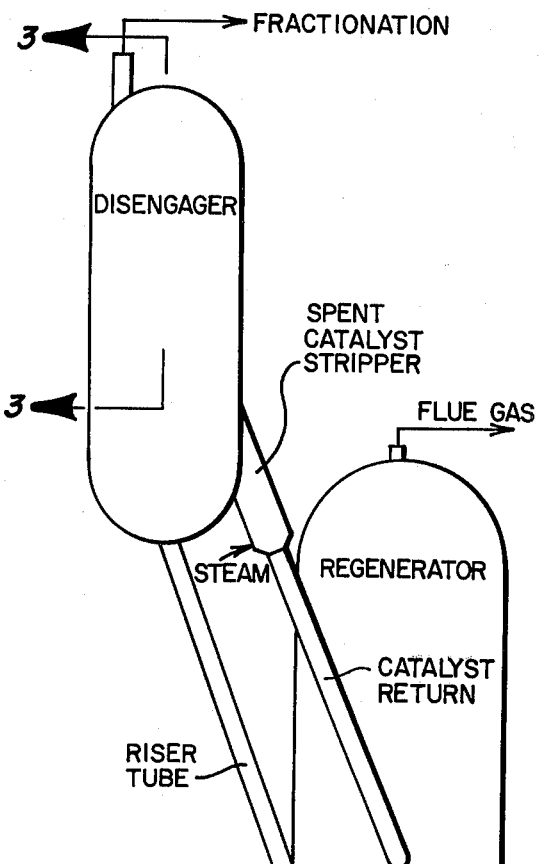
FIG. 1 is a diagrammatic elevational view of a typical FCC unit incorporating the structural arrangement in accordance with the preferred embodiment of this invention.

As previously pointed out, the adaptation of the concept behind this invention in connection with the operation of a typical fluidized catalytic cracker represents the preferred embodiment thereof. Preliminary to presenting a detailed description of this embodiment, a brief outline of the general conditions encountered in operating a fluidized catalytic cracker will be given. As shown in FIG. 1, the hydrocarbon feedstock or oil charge is introduced into the bottom of the riser tube where it mixes with the incoming hot catalyst from the regenerator. The feedstock for this type of unit is generally a vacuum gas oil or a cylinder oil, both overhead fractions of a vacuum distillate still to which reduced crude is introduced as the feedstock. Reduced crude is a residual oil resulting from the atmospheric distillation of crude oil for the purpose or removing naptha, kerosene and like fractions.

Contact of the hot catalyst leaving the regenerator at a temperature of about 1150°–1350° F. with the feedstock introduced at a temperature of about 500°–800° F. results in an essentially instantaneous generation of large volumes of gaseous hydrocarbons. Generally too, steam is utilized to facilitate the injection of the feedstock which likewise contributes to this volumetric buildup. With the proper selection of temperature in relationship to the riser tube diameter, superficial space or transport velocities in the order of from 35 to 50 feet per second are accordingly realized, such being sufficient to effect essentially cocurrent flow of the catalyst particulates and the vaporous hydrocarbon throughout the riser tube. The catalysts applicable for this purpose customarily range in size from about 5 to 100μ with the major portion thereof being within the range from 40 to 80μ. The specific transport velocity is selected so as to minimize slippage of the catalyst and yet provide sufficient residence time within the riser tube in order to realize the optimum degree of conversion of the feedstock. Once this conversion has been attained, the object becomes one of separating the catalyst from the cracked hydrocarbons as quickly and efficiently as possible. This is achieved in a catalyst disengaging chamber all as described hereinbelow in connection with the description of the preferred embodiment.

Figure 3:
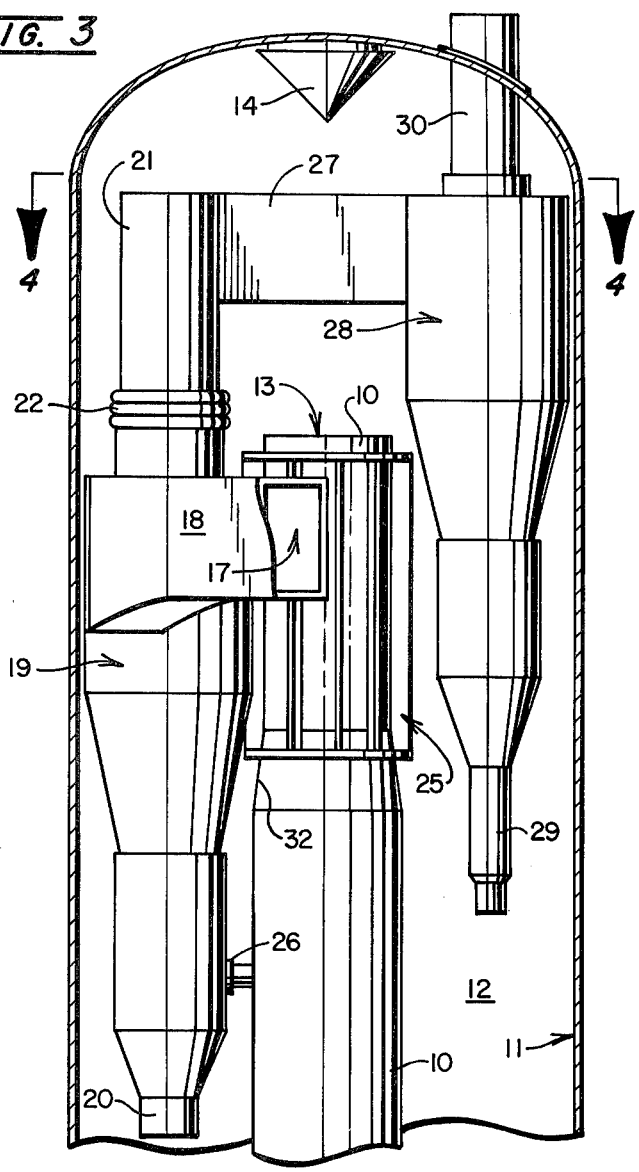
FIG. 3 is a sectional view, partly in elevation, taken along line 3—3 of FIG. 1 illustrating the terminal portion of the downstream end of the riser tube and its relationship with respect to a disengaging chamber and a cyclonic separator.

The preferred embodiment will now be described in light of the accompanying drawings. As shown in FIG. 3, the downstream extremity portion of riser tube 10 is concentrically disposed in disengaging vessel 11. The space 12 within said disengaging vessel around and above the riser tube 10 comprises the disengaging chamber. At its downstream extremity end, riser tube 10 is in open communication with the disengaging chamber 12 through opening 13, which as shown is an endwise unrestricted opening. Directly above the opening 13 of the riser tube 10 a downwardly facing deflector cone 14 is mounted to the top of the disengaging chamber. The principal purpose of deflector cone 14 is to prevent the discharged catalyst particulates from abrading the upper end of the disengaging vessel. Also this deflector means is appropriately designed to minimize reentry of the particles into the riser tube.

Figure 2:
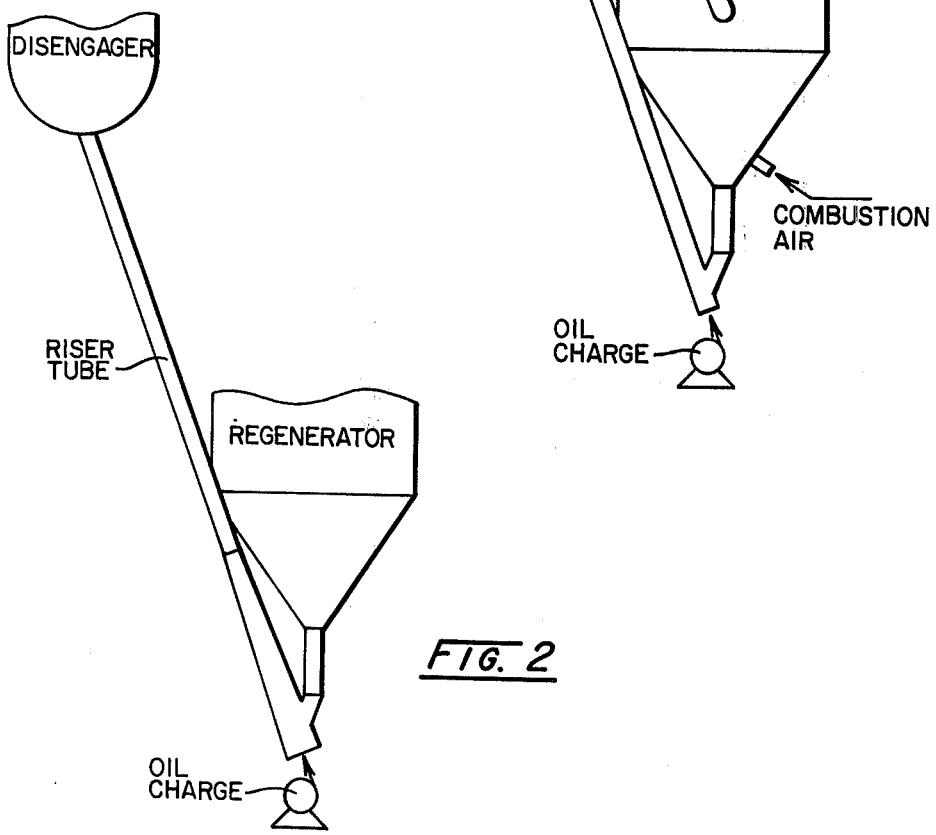
FIG. 2 is a fragmentary elevational view of a FCC unit shown in FIG. 1 but featuring the use of a riser tube having a tapered section at the upstream portion thereof.

The riser tube 10 can be of uniform diameter throughout its entire length as shown in FIG. 1 or have a tapered section disposed at the upstream end portion thereof as shown in FIG. 2. The tapered design affords more latitude in controlling reactants residence time as well as facilitating the disengagement of the catalyst from the gas stream in the manner contemplated in accordance with the present invention. In hydrocarbon conversion operations of the type herein concerned, the tapered section extends for about a third of the overall length of the riser tube. The degree of taper is dependent upon a number of factors applicable to the particular operation concerned such as overall length of the riser tube, extent of residence time desired, catalyst size, etc.

Figure 4:
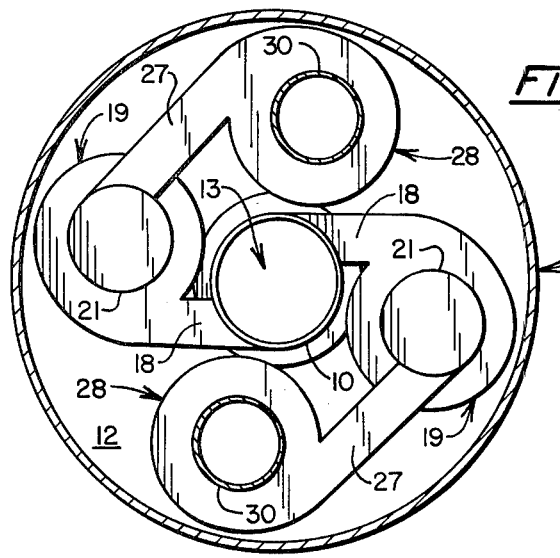
FIG. 4 is a cross-sectional view, partly in elevation, taken along line 4—4 of FIG. 3.

Spaced downstream of, but near the riser outlet opening 13, is at least one port 17 in the sidewall of the riser tube. The preferred arrangement in this respect, however, comprises a balanced or symmetrical system in which the riser tube is provided with two sidewise rectangular ports 17, 17 which are diametrically opposite one another, each of which serves to communicate directly with a separate two-stage series cyclone separation system. This arrangement is illustrated in FIG. 4 wherein each sidewise port 17, 17 is connected via a corresponding lateral or transverse conduit 18, 18 to the respective inlets of first-stage cyclones 19, 19. The cyclones can take the form of any known configuration thereof useful for separating solids from the gases. It is important, however, that the first stage of the individual cyclonic separation systems solely communicates with the corresponding sidewise port 17 so that none of the gases flowing therethrough are discharged into the disengaging chamber.

The gas outlets 21, 21 of the first-stage cyclones are connected through conduits 27, 27 to the respective inlets of the second-stage cyclones 28, 28. The first- and second-stage cyclone diplegs, shown in FIG. 3 at 20 and 29, respectively, discharge the catalyst particles separated in the applicable cyclone to the bottom of the disengaging chamber. The gas outlets 30, 30 of the second-stage cyclones extend through the top of the disengaging vessel and are connected to a manifold leading to the fractionator (not shown).

As can be noted from the foregoing description, there is essentially no net flow or gases within the disengaging chamber 12 under steady state conditions beyond that resulting from the customary practice of introducing a moderate amount of steam for the purpose of stripping the catalyst residing in the bottom of the disengaging vessel. This quiescent condition serves to passively restrain the flow of gases into the disengaging zone and facilitates diversion thereof into the cyclonic separation system. The catalyst particulates, on the other hand, by virtue of the inertial momentum associated therewith are for the most part propelled into the disengaging chamber and collected.

Figure 5:
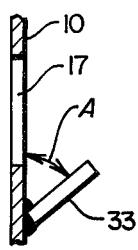
FIG. 5 is a fragmentary vertical section of a baffle or defector means positioned within the riser tube for minimizing carry-through of catalyst within the cyclonic separator.

Separation of the catalyst particulates is basically achieved through the abrupt diversion of the gas stream laterally in relation to the riser tube whereas the catalyst discharges into the disengaging chamber in essentially the flow pattern established in the riser tube. However, this means for effecting separation can be further enhanced by increasing the transport velocity just upstream of the sidewise ports 17, 17. For this purpose, it is preferred to employ a conical neck or restrictor section in the riser as indicated by the step-down section at 32 in FIG. 3. Alternatively, particularly where an assymetrical or unbalanced cyclone arrangement is used, it is advantageous to employ a baffle or deflector means, taking the form of a deflector plate 33 as shown in FIG. 5. Deflector plate 33 projects angularly inwardly from the riser sidewall just upstream of the sidewall port 17 and in line therewith such that the catalyst particles are deflected away from said port. The plate is positioned at an angle A (about 30°) with respect to the riser tube sidewall and desirably projects laterally to the extent of about 15% of the riser tube diameter.

In the foregoing illustration of the preferred embodiment of this invention, a riser tube enters the disengaging chamber through an opening in the bottom end, the cyclones are physically disposed in the chamber. Those skilled in the art will appreciate, however, that it is not necessary that the riser enter the disengaging chamber through the bottom, and in fact, the riser may enter into the side or even the top, and that the cyclones may be physically disposed outside of the disengaging chamber, as may be convenient especially in systems other than hydrocarbon systems. It is not the physical disposition of the cyclones in relation to the disengaging chamber which is important, but rather the fact that the riser discharges through an endwise opening into the chamber and that it feeds through a sidewise opening just upstream of the endwise opening, to the inlet of the cyclone, regardless of whether the cyclone is inside or outside of the disengaging chamber.

What is claimed is:

1. Apparatus for the separation of solid particulates suspended in a gaseous medium which comprises:
    a disengaging chamber serving as a reservoir for the collected solid particulates in which there is essentially no net flow of gases while effecting separation;
    an enlongated tubular conduit having an upstream and downstream end, the latter directly communicating with said chamber via an unrestrictive axial opening;

means for effecting the flow of a gas-solid stream from the upstream end of said conduit toward the downstream end; and cyclone separator means having an inlet laterally communicating with said elongated tubular conduit near said downstream axial opening thereof and adapted to discharge solid particulates separated therein into said disengaging chamber and to vent said gaseous medium through the outlet thereof outside said disengaging chamber.

2. Apparatus for conducting the fluidized catalytic cracking of petroleum hydrocarbons and the separation of catalyst particulates from the converted hydrocarbon products which comprises the combination of:

a disengaging chamber serving as a reservoir for the separated catalyst particulates in which there is essentially no net flow of gases while effecting separation;

a generally vertically positioned elongated tubular reaction zone of substantially less cross-sectional area than that of said chamber and having an upstream and downstream end, the latter in open communication with said chamber via an unrestricted axial opening;

means for effecting essentially cocurrent flow of the catalyst particulates and vaporous hydrocarbons from the upstream end of said reaction zone toward the downstream end; and cyclone separator means having an inlet laterally communicating with the tubular reaction zone near said downstream axial opening thereof and adapted to discharge catalyst particulates separated therein into said disengaging chamber and to vent the converted hydrocarbon products through the outlet thereof outside said disengaging chamber.

3. An apparatus in accordance with claim 2 wherein the diameter of the upstream end of said tubular reaction zone is greater than that of the downstream end thereof.

4. An apparatus in accordance with claim 3 wherein the tapered portion of the tubular reaction zone extends for less than one-half of the total length thereof.

* * * * *